US011436365B1

(12) United States Patent
Murray et al.

(10) Patent No.: US 11,436,365 B1
(45) Date of Patent: Sep. 6, 2022

(54) GENERATING A COMPLIANCE REPORT OF DATA PROCESSING ACTIVITY

(71) Applicant: INTUIT INC., Mountain View, CA (US)

(72) Inventors: Calum Murray, Fort Collins, CO (US); Jacqueline Wilkosz, San Jose, CA (US); Victor Feinstein, Emerald Hills, CA (US); Denise McInerney, Redwood City, CA (US)

(73) Assignee: INTUIT, INC., Mountain View, CA (US)

( * ) Notice: Subject to any disclaimer, the term of this patent is extended or adjusted under 35 U.S.C. 154(b) by 577 days.

(21) Appl. No.: 16/459,839

(22) Filed: Jul. 2, 2019

(51) Int. Cl.
*G06F 21/62* (2013.01)
*G06K 9/62* (2022.01)
*G06Q 10/06* (2012.01)

(52) U.S. Cl.
CPC ....... *G06F 21/6245* (2013.01); *G06K 9/6263* (2013.01); *G06Q 10/0637* (2013.01)

(58) Field of Classification Search
CPC .............. G06F 21/6245; G06K 9/6263; G06Q 10/0637

USPC .......................................................... 726/27
See application file for complete search history.

(56) References Cited

U.S. PATENT DOCUMENTS

2019/0347429 A1* 11/2019 Jean-Louis ........... G06F 16/353
2020/0311304 A1* 10/2020 Parthasarathy ....... H04L 63/083

* cited by examiner

*Primary Examiner* — Jeffrey C Pwu
*Assistant Examiner* — Nega Woldemariam
(74) *Attorney, Agent, or Firm* — Patterson & Sheridan, LLP (57) ABSTRACT

Certain aspects of the present disclosure provide techniques for providing a compliance report of data processing to a governing authority. In order to adhere to a regulation of a governing authority, upon receiving the request for a compliance report, a data category and each processing capability category is extracted from a live data catalog service. Based on the extracted categories, a record of data processing is generated for each processing capability category associated with a data category. Further, based on the data category extracted, a compliance report template is retrieved. With the compliance report template and records of data processing, a compliance report is generated and provided to the governing authority.

20 Claims, 5 Drawing Sheets

| Name and Contact Details | | Data Protection Officer | | Representative | |
|---|---|---|---|---|---|
| John Smith<br>123 Main St.<br>Seattle, WA 98101<br>jsmith@abcinc.com<br>206-555-5551 | | Mary Jones<br>123 Main St.<br>Seattle, WA 98101<br>mjones@abcinc.com<br>206-555-5555 | | Not Applicable | |
| Record Owner | Processing Purpose | Categories of Individuals | Categories of Personal Data | Categories of Recipients | |
| ABC Inc. | Accounting | Customer | General Info | XYZ Org. | |
| ABC Inc. | Accounting | Customer | General Info | MNO Ltd. | |
| ABC Inc. | Tax Report | Customer | General Info | XYZ Org. | |
| ABC Inc. | Tax Report | Customer | General Info | MNO Ltd. | |
| ABC Inc. | Bank Account | Customer | General Info | XYZ Org. | |
| ABC Inc. | Bank Account | Customer | General Info | MNO Ltd. | |

[Report Error] [Submit]

GENERATING A COMPLIANCE REPORT OF DATA PROCESSING ACTIVITY

INTRODUCTION

Aspects of the present disclosure relate to a method and system of generating compliance reports of data processing activities consistent with regulations from a governing authority. In particular, embodiments of the present disclosure relate to identifying a type of personal data and how the personal data is processed to generate a compliance report upon request of the governing authority.

BACKGROUND

Organizations are responsible for collecting, storing, and processing a variety of types of personal data for customers, employees, and clients. For example, an organization can be responsible for contact information (e.g., addresses, phone numbers, and email addresses), personal identifying information (e.g., Social Security numbers, Personal Identification Numbers), financial information (e.g., bank account numbers, transactions), tax information (e.g., tax return, marital status, number of dependents), and medical information (e.g., current medication, history of illnesses, family history). While organizations do take steps to protect the personal data within their purview, including encryption and limiting access to personal data, not all organizations protect personal data in the same manner or to the same extent. Further, the protection of personal data is even more difficult for organizations that process personal data in a distributed computing environment in which multiple computing systems of an organization work together and process personal data.

Governing authorities on a global scale have stepped in and passed laws and issued regulations aimed toward protecting the privacy of and securing personal data collected, processed, and/or stored by organizations. Governing authorities (e.g., local governments, national governments, industry authorities) require compliance with the data protection laws and regulations and can request written compliance reports as proof of the compliance at any time. In particular, the European Union passed in 2016 the General Data Protection Regulation (GDPR) to ensure that personal data collected by organizations is protected within the European Union. Article 30 of the GDPR requires that organizations generate and maintain compliance reports about an organization's personal data processing activities including what personal data is collected, the purpose of collecting the personal data, how long the personal data will be held, and who the personal data is sent to. Additionally, Article 30 requires the compliance reports contain specific pieces of information.

Traditionally, compliance reports have been manually generated in order to meet the requirements of the GDPR. However, manual generation of compliance reports is arduous, time consuming, and subject to human error. Therefore, a solution is needed to provide compliance reports to governing authorities, such as the European Union, without monopolizing the resources of an organization.

BRIEF SUMMARY

Certain embodiments provide a method for providing a compliance report. The method generally includes receiving a request from a requesting system for an electronic compliance report of data processing activity for personal data in a distributed computing environment. The method further includes extracting, based on the request, from a live data catalog service and corresponding to the personal data: a first data category from a set of data categories and each processing capability category associated with the first data category from a set of processing capability categories. The method further includes generating for each processing capability, based on the first data category, a record of data processing activity for the personal data. The method further includes retrieving a compliance report template based on the first data category from a template database. The method further includes generating, based on the compliance report template and each record of data processing activity, the electronic compliance report of the data processing activity in the distributed computing environment for the personal data.

Other embodiments provide systems configured to perform methods for providing a compliance report, such as the aforementioned method, as well as non-transitory computer-readable storage mediums comprising instructions that, when executed by a processor of a processing system, cause the processing system to perform methods for providing a compliance report.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for generating compliance reports consistent with regulations from a governing authority using a live data catalog service and compliance report templates for data processed by an organization in a distributed computing environment.

To adhere to the regulations of a governing authority, upon receiving a request from a requesting system of the governing authority for a compliance report, a compliance report system of an organization identifies a type of personal data and how that type of personal data is processed in the distributed computing environment from a live data catalog service. The live data catalog service maintains an up-todate record of where and how data is processed by the organization's distributed computing environment, including which computing systems of the organization are handling what type of data and how the data is being processed by the computing systems. The compliance report system then generates a record describing how the personal data is processed, which in turn is used to generate a compliance report, based on a compliance report template, for the governing authority.

In one embodiment, an organization processes personal data in a distributed computing environment using multiple computing systems. In such instance, a compliance report system of an organization can receive a request to produce a compliance report for a record of how personal data is processed by the organization, such as a request for an electronic compliance report. In some cases, the request for a compliance report may be for each data category and how each data category is processed. In other cases, the compliance report request may be for specific data categories and how each is processed. For example, the European Union can request an electronic compliance report from an organization operating within the European Union as part of Article 30 compliance of the General Data Protection Regulation (GDPR). As part of the request, the European Union can request a separate electronic compliance report for each data category and how each data category is processed by the organization.

Based on the request, the compliance report system extracts a data category and each processing capability applied to the data category from a live data catalog service. The live data catalog service maintains a record of where and how data is processed in a distributed computing environment of an organization. In some cases, the live data catalog service maintains an up-to-date record of data processing by the organization as well as a historical record of data processing by the organization. For example, the data in a live data catalog service is updated manually or automatically updated through an API. In some cases, the live data catalog service is a user interface over a database storing data categories and processing capabilities.

The data category indicates a type of personal data, and the processing capability indicates how the personal data is processed. For example, the organization can collect contact information from customers and use the contact information of customers for accounting and small business reporting. In such example, the data category is contact information, and the processing capabilities are accounting and small business reporting. In some cases, the data categories can be created based on domain knowledge.

Using the type of data category extracted from the live data catalog service, the compliance report system retrieves a compliance report template. In some cases, the compliance report template may be consistent with data protection rule(s) established by the regulatory system requesting the compliance report. For example, the compliance report template may be consistent with a data protection rule defined by Article 30 of the GDPR established by the European Union.

Further, using the data category and one of the processing capabilities, the compliance report system generates a record of data processing activity. A record is generated for each processing capability applied to a data category, indicating how data is processed by the organization. With the compliance report template and record of data processing, a compliance report is generated consistent with the request from the governing authority. For example, the electronic compliance report generated may fulfill the requirements of Article 30 of the GDPR.

The method of generating a compliance report consistent with the regulations of a governing authority allows for the compliance report system of an organization to provide compliance reports on-demand. Further, the method of generating the compliance report reduces the amount of resources the organization needs to devote to compliance reporting with the governing authority, and in turn, allows the organization to utilize resources elsewhere, including further data protection. For example, rather than spending time manually generating reports, the organization can now allocate the time and resources saved by generating the compliance report with a template and live data catalog service to develop and implement new methods of data protection.

In addition, an organization processing large amounts of different data types in a distributed computing environment cannot feasibly generate compliance reports on-demand without a compliance report system that utilizes a template database and live data catalog service to generate a compliance report. The template database can include all of the templates for generating compliance reports that have been formatted and defined in such a manner that the templates adhere to compliance reporting regulations. The live data catalog service can maintain an up-to-date record (as well as a historical record) of data processing in the distributed computing environment including the data category associated with data and the processing capabilities applied to the data. With the template database and live data catalog service, the compliance report system can accurately report data processing activities in real time or approximately real time of a rapidly changing distributed computing environment. Additionally, the template database and live data catalog service can be leveraged by the compliance report system to keep up with changing data protection laws.

Without a template database and live data catalog service, the compliance report system would have to search through all of the computing systems of a distributed computing environment to determine which computing systems process what types of data and how, which can be a lengthy and computationally intensive process. Instead, the compliance report system utilizing a template database and live data catalog service can query the live data catalog service and generate a compliance report with data extracted from the live data catalog service using a template from the template database, thereby reducing the amount of time and computation resources needed for generating a compliance report.

Example Computing Environment for Generating a Compliance Report

Figure 1:
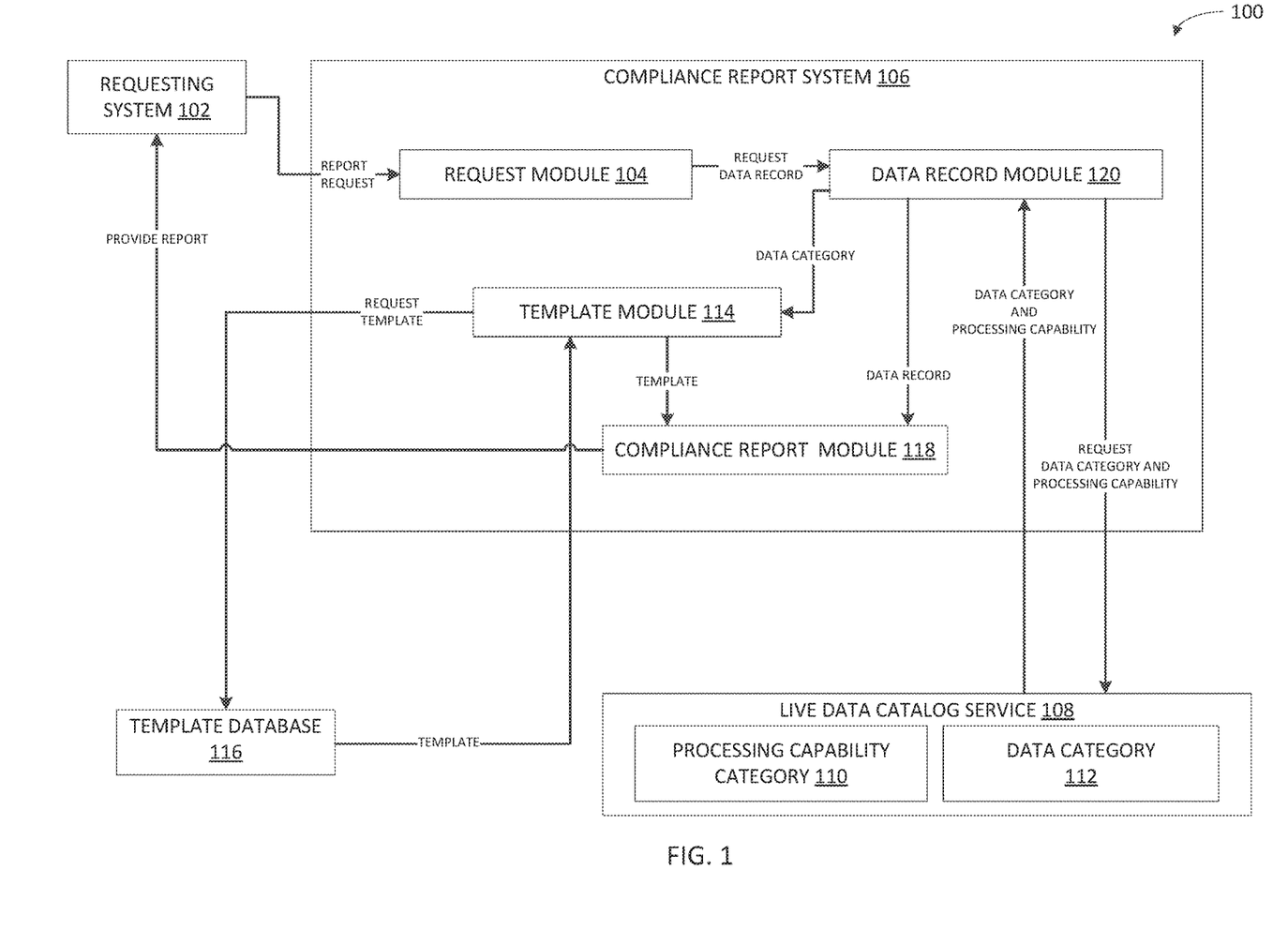
FIG. 1 depicts an example computing environment for generating a compliance report consistent with regulations of a governing authority.

FIG. 1 depicts an example computing environment 100 for generating a compliance report consistent with regulations of a governing authority. The example computing environment 100 comprises a requesting system 102, a compliance report system 106, a live data catalog service 108, and a template database 116.

As depicted, the compliance report system 106 receives a request for a compliance report from a requesting system 102. In some cases, the compliance report system 106 receives a request for an electronic compliance report. The compliance report system 106 may be associated with an organization that collects and/or processes personal data from employees, customers, or clients, or that of others. In some cases, the organization collects and/or processes personal data in a distributed computing environment. As such, the compliance report system 106 may be associated with a live data catalog service 108 that organizes the personal data collected and/or processed by the organization. In some implementations, the live data catalog service 108 organizes the personal data collected and/or processed by a type of data category 112. For example, data categories 112 can include accounts, billing, documents, financial transaction, and contact information, to name a few, or other information relevant to an individual or to a transactional relationship. In the live data catalog service 108, each data category 112 is assigned one or more processing capability categories 110, such as accounting and document management, indicating how the data is processed. Further, the live data catalog service 108 maintains an up-to-date record of where and how data is collected and/or processed by the distributed computing environment of the organization. In some cases, the live data catalog service 108 can maintain a historical record of where and how data is collected and/or processed by the organization.

The requesting system 102 may be associated with a governing authority that has established regulations for protection of the personal data and requires compliance reports as proof of compliance. In some cases, the requesting system 102 is associated with a governing authority such as the European Union, which has established the General Data Protection Regulation (GDPR) for protecting personal data of individuals collected and/or processed by an organization in the European Union.

In other cases, the requesting system 102 is associated with a governing authority such as the United States Department of Health and Human Services, which is responsible for establishing regulations according to the Health Insurance Portability and Accountability Act of 1996 (HIPAA) to secure and protect health information of patients in the United States. The United States Department of Health and Human Services may require organizations with medical information of patients to provide how the medical information is processed to determine whether such organizations are protecting the medical information of patients as required by HIPAA. The requesting system 102 is not limited to governmental organizations and can include industry organizations that have established regulatory authority.

Upon receiving the request from the requesting system 102, the compliance report system 106 generates a compliance report (e.g., an electronic compliance report) consistent with the regulation of the requesting system 102. In some cases, the compliance report system 106 can generate a compliance report consistent with the requirements of Article 30 of the GDPR. In other cases, the compliance report system 106 can generate a compliance report consistent with the requirements of HIPAA. As depicted, the generated compliance report is provided to the requesting system 102. In some implementations, the generated compliance report is provided to the requesting system 102 on-demand. In other implementations, the generated compliance report is provided at a specific time requested by the requesting system 102. For example, the requesting system 102 can request that the compliance report system 106 provide the compliance report in 24 hours.

The compliance report system 106 that generates the compliance report includes a request module 104, a data record module 120, a template module 114, and a compliance report module 118.

As depicted, the request module 104 of the compliance report system 106 receives the request from the requesting system 102 for a compliance report. For example, the request module 104 can receive a request from the European Union, under Article 30 for a compliance report indicating what personal data the organization has and how the personal data is processed. In some cases, the request received by the compliance report system 106 via the request module 104 may be for a portion of the personal data. For example, the requesting system 102 can request a compliance report for one data category of personal data. In other cases, the request may be for a compliance report for each data category of personal data collected and/or processed by the organization.

After receiving the request for a compliance report, the request module 104 sends a signal to a data record module 120 to generate a record of data processing indicating how data is processed. For example, the record of data processing comprises a data category and a corresponding processing capability category. Further, the record of data processing can include which individual (e.g., customer, client, employee) the personal data belongs to and which (if any) third party receives the personal data from the organization.

As depicted, the data record module 120 receives the signal to generate a data record from the request module 104 and extracts a data category 112 and each corresponding processing capability category 110 indexed in the live data catalog service 108. In some implementations, the signal from the request module 104 may be to generate a data record for a portion of personal data. In such cases, the data record module 120 determines which data category 112 corresponds to the portion of personal data. Based on the determination, the data category 112 and corresponding processing capability categories 110 are extracted from the live data catalog service 108. In other implementations, the signal from the request module 104 may be to generate data records for all of the personal data. In such cases, the data record module 120 determines each data category for the organization. For example, the data record module 120 can determine there are ten data categories 112 established in the live data catalog service 108. Based on the determination, each data category 112 and corresponding processing capability categories 110 are extracted from the live data catalog service 108.

The data record module 120 utilizes the extracted data category 112 and corresponding processing capability category 110 to generate a record of data processing for each processing capability category. In some implementations, a single processing capability category 110 corresponds to a data category 112. In such cases, the data record module 120 generates one data processing record. In other implementations, multiple processing capability categories 110 correspond to a single data category 112. In such cases, multiple data processing records are generated. In some implementations, the data record module 120 generates data records for each data category 112 extracted from the live data catalog service 108.

After the data processing records are generated for each processing capability category 110 associated with a data category 112, the data record module 120 sends a signal to the template module 114 to retrieve a compliance report template from a template database 116. In some implementations, the signal indicates the number of data categories 112 extracted from the live data catalog service 108. In such cases, the template module 114 retrieves a compliance report template for each data category 112. In some implementations, the template module 114 retrieves the compliance template report from a template database 116 that comprises compliance report templates formatted specific to a regulation. For example, the compliance report templates can be in a format that adheres to the requirements of Article 30 of the GDPR. In some implementations, the template database 116 is co-located with the compliance report system 106. In other implementations, the template database 116 is located remotely to the compliance report system 106.

The retrieved compliance report template is sent to the compliance report module 118 by the template module 114. Further, the compliance report module 118 receives the records of data processing generated from the data record module 120. With the compliance report template and the records of data processing, the compliance report module 118 generates a compliance report indicating how personal data is processed by the organization. In some implementations, the compliance report module 118 can generate a separate compliance report document for each data category 112, as required by the data protection rule(s), based on a single compliance report template retrieved by a template module 114. For example, the same compliance report template can be used to generate multiple compliance reports. In other implementations, multiple compliance report templates are retrieved and each compliance report template is used to generate a separate compliance report for each data category 112. In still other implementations, the compliance report module 118 generates a single compliance report for all of the data categories 112.

As depicted, the compliance report module 118 provides the generated compliance report to the requesting system 102. In some implementations, the generated compliance report can be provided on demand to the requesting system 102. In other implementations, the generated compliance report can be provided to the requesting system 102 at a time specified by the requesting system 102. In such cases, prior to providing the generated compliance report to the requesting system, the compliance report can be stored in a database associated with the compliance report system 106.

Further, in some implementations, prior to sending the compliance report to the requesting system, the generated compliance report can be reviewed by the compliance report system 106. For example, the generated compliance report can be displayed in a user interface on a computing device of a reviewer associated with the organization. The reviewer can determine whether the compliance report has any errors. If the reviewer determines there is an error, the reviewer can provide feedback via the user interface, indicating the error. If there is no error, the reviewer can indicate that the generated compliance report is ready to be sent to the requesting system 102.

While not depicted, the compliance report system 106 may interact with the requesting system 102, live data catalog service 108, and template database 116 via a network, which allows the compliance report system 106 to receive the request for the compliance report, extract a data category 112 and corresponding processing capability categories 110, retrieve a compliance report template, and provide the generated compliance report. The network can include, for example, local area networks (LANs), wireless LANs, wide area networks (WANs), wireless WANs (WWANs), 3G, 4G, LTE, and other technologies capable of transmitting data between devices.

Example Flow Diagram for Generation of a Compliance Report

Figure 2:
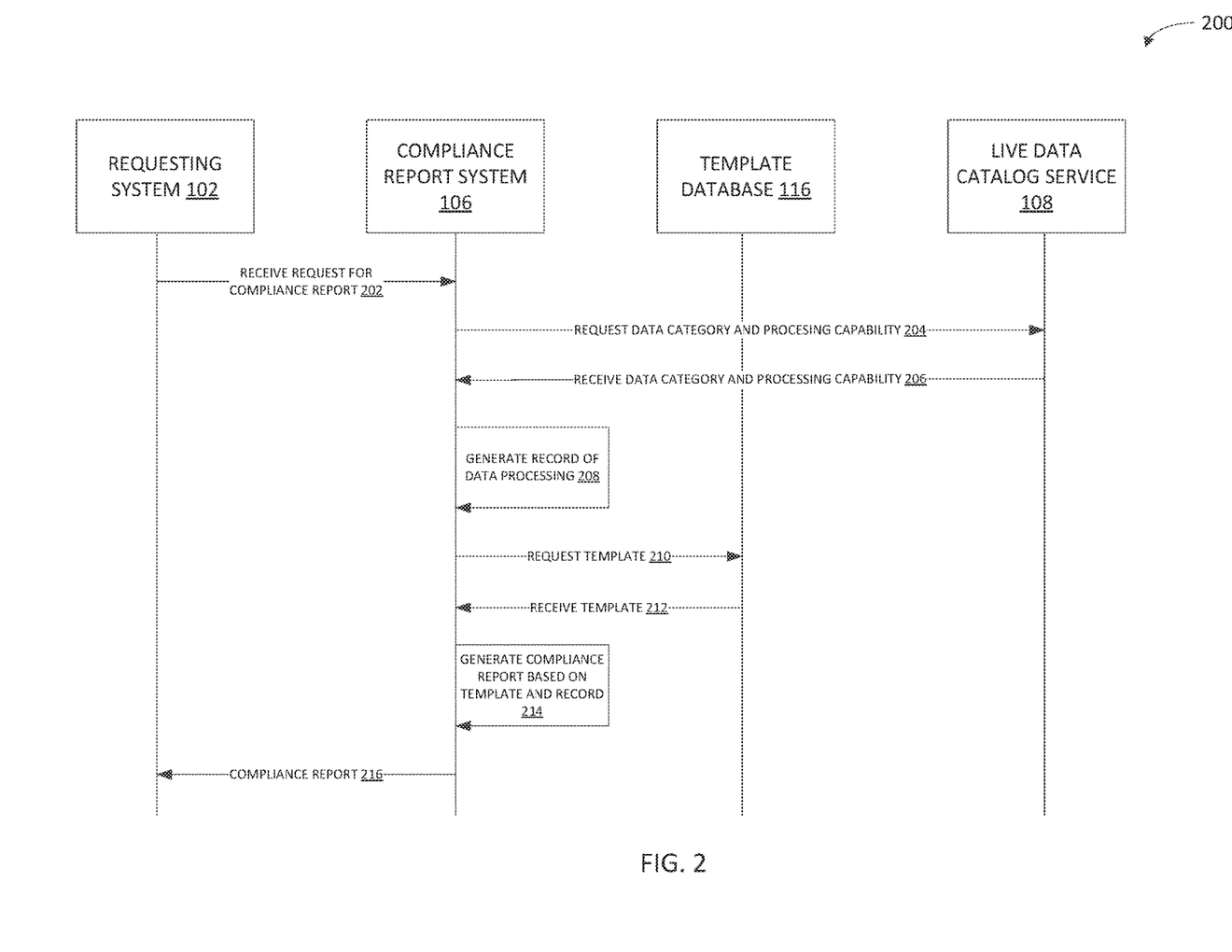
FIG. 2 depicts an example flow diagram of the generation of a compliance report consistent with regulations of a governing authority.

FIG. 2 depicts an example flow diagram 200 for generation of a compliance report consistent with regulations of a governing authority, as described with respect to FIG. 1.

The example flow diagram 200 begins with the compliance report system 106 receiving 202 a request for an electronic compliance report of data processing activity from a requesting system 102. Upon receiving the request, the compliance report system 106 requests 204 and receives 206 a data category and each processing capability category associated with the data category from a live data catalog service 108 based on the request. The compliance report system 106 generates 208 a record of data processing for each processing capability category of a data category.

Once each record of data processing is generated for each processing capability applied to a data category, the compliance report system 106 requests 210 and receives 212 a compliance report template from a template database 116. In some implementations, the compliance report system 106 retrieves a compliance report template based on the data category extracted. In some cases, a separate template is retrieved for each data category. For example, different data categories can have different compliance reporting requirements. In other cases, a single compliance report template is retrieved.

With the compliance report template and the records of data processing, the compliance report system 106 generates 214 an electronic compliance report. The compliance report system 106 then provides 216 the generated electronic compliance report to the requesting system 102.

Example Method for Generating a Compliance Report

Figure 3:
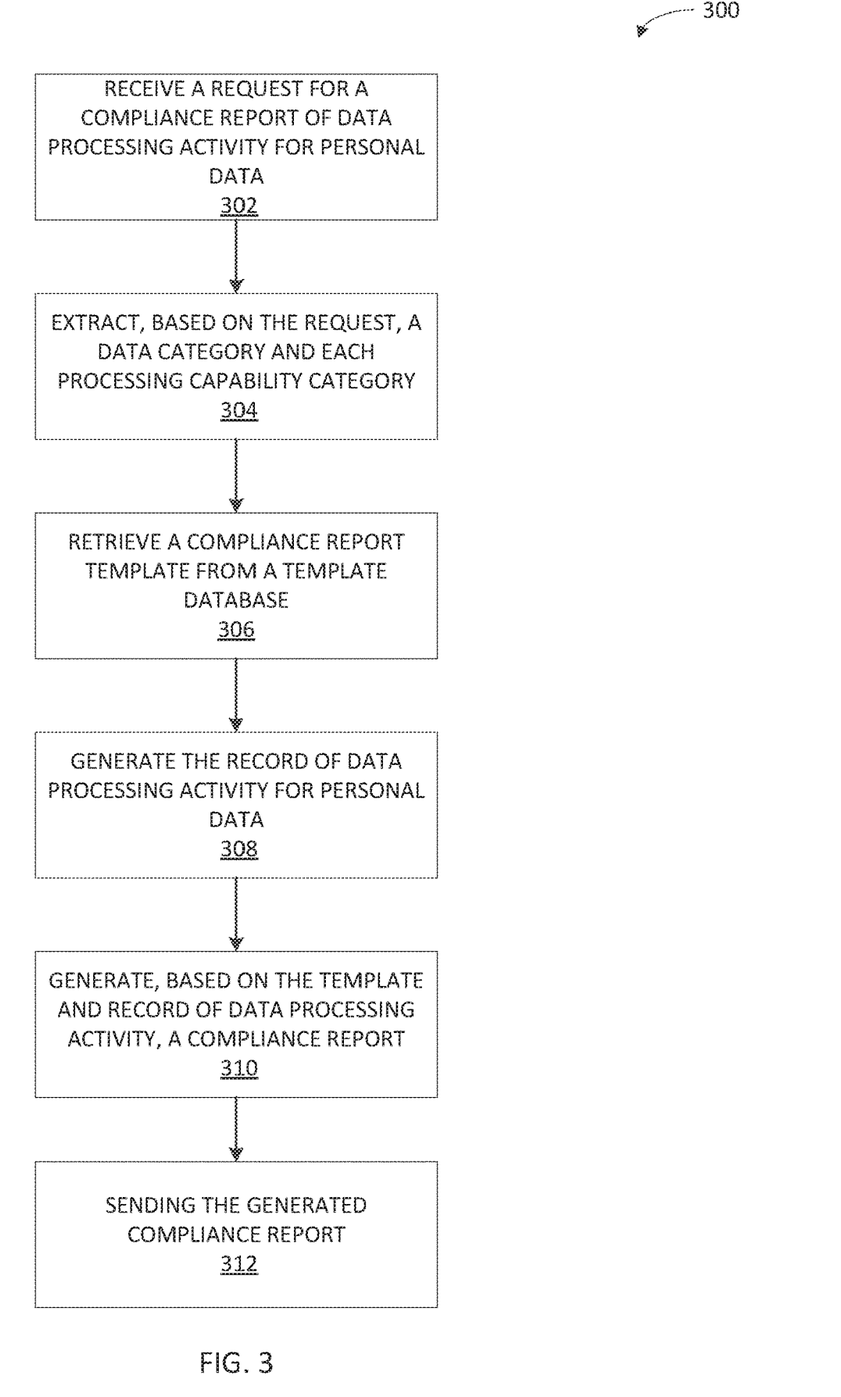
FIG. 3 depicts an example method for generating a compliance report consistent with the regulations of a governing authority.

FIG. 3 depicts an example method 300 for generating a compliance report consistent with regulations of a governing authority, as described with respect to FIGS. 1-2.

At step 302, a request is received for a compliance report of data processing activity for personal data. In some cases, the request for an electronic compliance report is received by an organization under a regulation from a requesting system associated with a governing authority. For example, the European Union can request an electronic compliance report under Article 30 of the GDPR.

At step 304, a data category and each processing capability associated with the category is extracted from a live data catalog service. Based on the request received from the requesting system of the governing authority, a data category from a set of categories is identified and extracted from a live data catalog service. Further, each processing capability associated with the data category is extracted from the live data catalog service. The extracted data category indicates a type of personal data and processing capabilities indicate how a particular type of personal data is processed by a data process of the organization.

At step 306, a compliance template report is retrieved. Based on the data category extracted from the live data catalog service, a compliance report template is retrieved from a template database. The compliance report template is formatted to comply with data protection rule(s) established by the governing authority. For example, the compliance report template retrieved from the template database is formatted consistent with data protection rules defined by Article 30 of the GDRP.

At step 308, a record of data processing activity is generated for each processing capability, based on the data category. The record of data processing indicates how a type of personal data is processed.

At step 310, a compliance report of the data processing activity for personal data is generated based on the compliance report template and each record of data processing activity. In some cases, a separate electronic compliance report is generated for each data category according to the data protection rule(s). For example, Article 30 of the GDPR can require a separate electronic compliance report for each record of data processing activity. In other cases, a single electronic compliance report comprising all of the generated records of data processing activity is required according to the data protection rule(s). For example, the HIPAA can require a single electronic compliance report that includes all of the records of data processing.

At step 312, the generated compliance report is sent by the compliance reporting system to the requesting system. In some cases, the generated electronic compliance report is sent to the requesting system upon generation of the electronic compliance report. In other implementations, the generated electronic compliance report is sent to the requesting system at a time requested by the requesting system. For example, the requesting system in the request for the electronic compliance report can request the generated electronic report be sent twenty-four hours after the request is received by the compliance reporting system.

In some cases, the compliance report is sent to a reviewer prior to sending the compliance report to the governing authority. The reviewer is associated with the organization and may review the compliance report on a computing device to determine whether the compliance report has any errors, as described in FIG. 1. If the reviewer determines there is an error with the generated compliance report, the reviewer provides such feedback, and an updated compliance report is generated that corrects the error in the previously generated compliance report.

Example of a Generated Compliance Report

Figure 4:
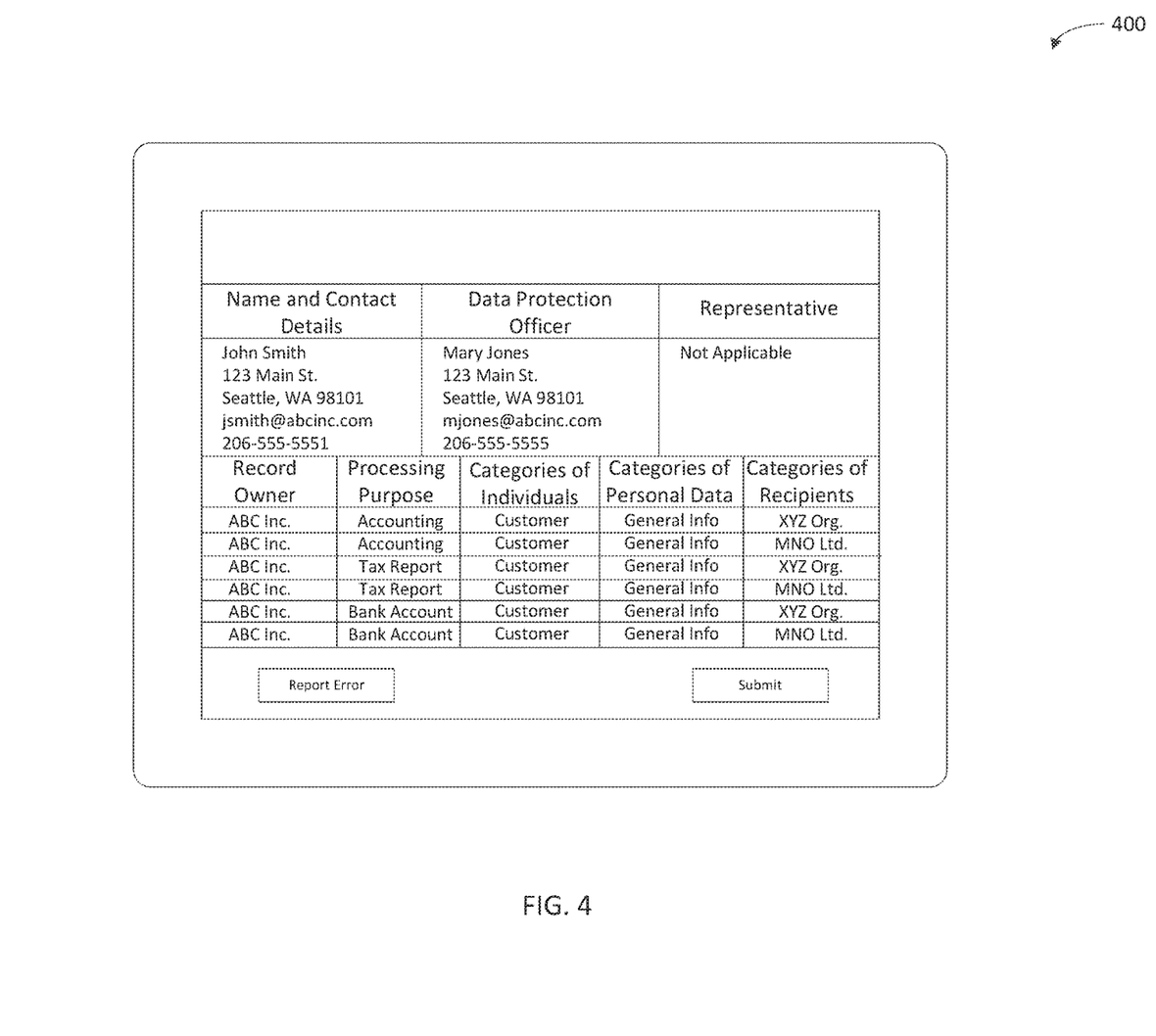
FIG. 4 depicts an example generated compliance report.

FIG. 4 depicts an example compliance report 400 generated by a compliance report system, as described with respect to FIGS. 1-3.

The compliance report includes data processing records generated for each type of data processing capability applied to a category of personal data. As depicted, the compliance report indicates how general information associated with customers is processed for accounting, tax reporting, and bank account purposes. Further, the compliance report indicates recipients of the general information of customers.

In some implementations, the generated compliance report is displayed by a computing device associated with the compliance report system prior to providing the compliance report. The displayed compliance report allows users associated with the compliance report system of an organization to provide feedback via the display. For example, if a user identifies an error in the generated compliance report, then the user may indicate the inaccuracy via the display of the computing device and provide feedback indicating what the error is. In some cases, the feedback can be used to regenerate a correct compliance report. Further, if the user determines there are no errors, then the user can indicate the compliance report is ready to be submitted to the requesting system.

In other implementations, the generated compliance report is displayed to a requesting system of the governing authority to determine compliance with regulation.

Example of a Compliance Report System for Generating a Compliance Report

Figure 5:
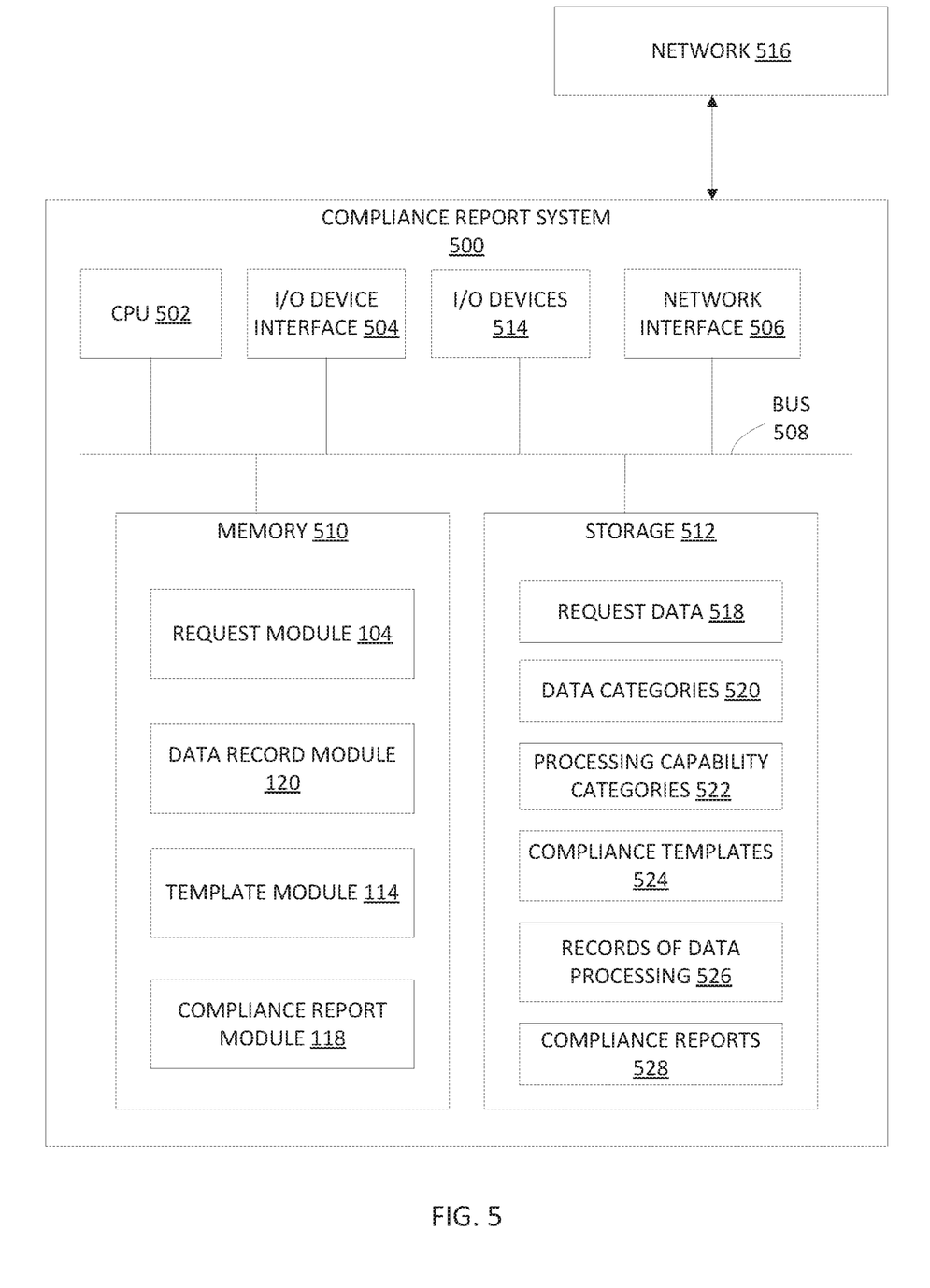
FIG. 5 depicts an example compliance report system for generating a compliance report consistent with regulations of a governing authority.

FIG. 5 depicts an example of a compliance report system 500 that may be used to perform methods described herein, such as the method for generating a compliance report consistent with regulations of a governing authority described with respect to FIGS. 1-3.

Compliance report system 500 includes a central processing unit (CPU) 502 connected to a data bus 508. CPU 502 is configured to process computer-executable instructions, e.g., stored in memory 510 or storage 512, and to cause the compliance report system 500 to perform methods described herein, for example with respect to FIGS. 1-3. CPU 502 is included to be representative of a single CPU, multiple CPUs, a single CPU having multiple processing cores, and other forms of processing architecture capable of executing computer-executable instructions.

Compliance report system 500 further includes input/output (I/O) device(s) 514 and interface(s) 504, which allows compliance report system 500 to interface with input/output devices 514, such as, for example, keyboards, displays, mouse devices, pen input, and other devices that allow for interaction with compliance report system 500. Note that while not depicted with independent external I/O devices, compliance report system 500 may connect with external I/O devices through physical and wireless connections (e.g., an external display device).

Compliance report system 500 further includes network interface 506, which provides compliance report system 500 with access to external networks 516 and thereby external computing devices.

Compliance report system 500 further includes memory 510, which in this example includes request module 104 that receives a request from a governing authority for a compliance report and generates a request for a record of data processing based on the request for the compliance report, as described above, for example with respect to FIGS. 1-2.

Memory 510 further includes data record module 120 that generates a record of data processing by extracting a data category and each processing capability applied to the data category from a live data catalog service, as described above, for example with respect to FIGS. 1-2.

Memory 510 further includes template module 114 that retrieves a compliance report template based on the data category extracted from the live data catalog service, as described above, for example with respect to FIGS. 1-2.

Memory 510 further includes compliance report module 118 that generates a compliance report based on the compliance report template and the record of data processing, as described above, for example with respect to FIGS. 1-2.

Note that while shown as a single memory 510 in FIG. 5 for simplicity, the various aspects stored in memory 510 may be stored in different physical memories, but all accessible by CPU 502 via internal data connections such as bus 508.

Compliance report system 500 further includes storage 512, which in this example includes request data 518, which may be received from a requesting system of a governing authority for a compliance report, as described with respect to FIGS. 1-3.

Storage 512 further includes data categories 520, which may be like a data category 112, as described with respect to FIG. 1.

Storage 512 further includes processing capability categories 522, which may be like a processing capability category 110, as described with respect to FIG. 1.

Storage 512 further includes compliance templates 524, which may be like a compliance report template, as described with respect to FIGS. 1-3.

Storage 512 further includes records of data processing 526, which may be like a record of data processing, as described with respect to FIGS. 1-3.

Storage 512 further includes compliance reports 528, which may be like a compliance report, as described with respect to FIGS. 1-3.

While not depicted in FIG. 5, other aspects may be included in storage 512.

As with memory 510, a single storage 512 is depicted in FIG. 5 for simplicity, but the various aspects stored in storage 512 may be stored in different physical storages, but all accessible to CPU 502 via internal data connections, such as bus 508, or external connection, such as network interface 506.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving a request from a requesting system for an electronic compliance report of data processing activity for personal data in a distributed computing environment;
   extracting, based on the request, from a live data catalog service and corresponding to the personal data:
   a first data category from a set of data categories; and
   each processing capability category associated with the first data category from a set of processing capability categories, wherein the live data catalog service maintains a record of operations in which data corresponding to the set of data categories is processed according to the set of processing capability categories in the distributed computing environment; and
   generating for each processing capability category associated with the first data category, based on the first data category, a record of data processing activity for the personal data;
   retrieving a compliance report template based on the first data category from a template database; and
   generating, based on the compliance report template and each record of data processing activity, the electronic compliance report of the data processing activity in the distributed computing environment for the personal data.

2. The method of claim 1, further comprising: sending the generated electronic compliance report to the requesting system.

3. The method of claim 1, further comprising:
   sending the generated electronic compliance report to a reviewer;
   receiving feedback from the reviewer of an error in the generated electronic compliance report; and
   generating an updated electronic compliance report to address the error.

4. The method of claim 1, wherein the retrieved compliance report template is formatted to comply with a data protection rule.

5. The method of claim 4, wherein the data protection rule is defined by General Data Protection Regulation, Article 30.

6. The method of claim 5, further comprising: generating a separate electronic compliance report for each data category in the set of data categories according to the data protection rule.

7. The method of claim 1, wherein the record of data processing activity includes at least:
   the first data category indicating a type of the personal data; and
   the processing capability category indicating a processing capability applied to the personal data.

8. A non-transitory computer-readable storage medium storing instructions for a method, the method comprising:
   receiving a request from a requesting system for an electronic compliance report of data processing activity for personal data in a distributed computing environment;
   extracting, based on the request, from a live data catalog service and corresponding to the personal data:
   a first data category from a set of data categories; and
   each processing capability category associated with the first data category from a set of processing capability categories, wherein the live data catalog service maintains a record of operations in which data corresponding to the set of data categories is processed according to the set of processing capability categories in the distributed computing environment; and
   generating for each processing capability category associated with the first data category, based on the first data category, a record of data processing activity for the personal data in the distributed computing environment;
   retrieving a compliance report template based on the first data category from a template database; and
   generating, based on the compliance report template and each record of data processing activity, the electronic compliance report of the data processing activity in the distributed computing environment for the personal data.

9. The non-transitory computer-readable storage medium of claim 8, further comprising: sending the generated electronic compliance report to the requesting system.

10. The non-transitory computer-readable storage medium of claim 8, further comprising:
    sending the generated electronic compliance report to a reviewer;
    receiving feedback from the reviewer of an error in the generated electronic compliance report; and generating an updated electronic compliance report to address the error.

11. The non-transitory computer-readable storage medium of claim 8, wherein the retrieved compliance report template is formatted to comply with a data protection rule.

12. The non-transitory computer-readable storage medium of claim 11, wherein the data protection rule is defined by General Data Protection Regulation, Article 30.

13. The non-transitory computer-readable storage medium of claim 12, further comprising: generating a separate electronic compliance report for each data category in the set of data categories according to the data protection rule.

14. The non-transitory computer-readable storage medium of claim 8, wherein the record of data processing activity includes at least:
the first data category indicating a type of the personal data; and
the processing capability category indicating a processing capability applied to the personal data.

15. A system, comprising:
a processor; and
a memory storing instructions which when executed by the processor perform a method, the method comprising:
receiving a request from a requesting system for an electronic compliance report of data processing activity for personal data in a distributed computing environment;
extracting, based on the request, from a live data catalog service and corresponding to the personal data:
a first data category from a set of data categories; and
each processing capability category associated with the first data category from a set of processing capability categories, wherein the live data catalog service maintains a record of operations in which data corresponding to the set of data categories is processed according to the set of processing capability categories in the distributed computing environment; and
generating for each processing capability category associated with the first data category, based on the first data category, a record of data processing activity for the personal data;
retrieving a compliance report template based on the first data category from a template database; and
generating, based on the compliance report template and each record of data processing activity, the electronic compliance report of the data processing activity in the distributed computing environment for the personal data.

16. The system of claim 15, further comprising: sending the generated electronic compliance report to the requesting system.

17. The system of claim 15, further comprising:
sending the generated electronic compliance report to a reviewer;
receiving feedback from the reviewer of an error in the generated electronic compliance report; and
generating an updated electronic compliance report to address the error.

18. The system of claim 15, wherein the retrieved compliance report template is formatted to comply with a data protection rule.

19. The system of claim 18, wherein the data protection rule is defined by General Data Protection Regulation, Article 30.

20. The system of claim 19, further comprising: generating a separate compliance report for each data category in the set of data categories according to the data protection rule.

* * * * *